United States Patent
Knuckey et al.

(10) Patent No.: US 9,362,584 B2
(45) Date of Patent: Jun. 7, 2016

(54) REGENERATIVE FUEL CELL WITH CATHOLYTE COMPRISING A POLYOXOMETALATE AND A VANADIUM (IV)-COMPOUND

(75) Inventors: Kathryn Knuckey, Lancashire (GB); Belloumi Kangati, Manchester (GB); Clare Downs, Cheshire (GB); Andrew Potter, Liverpool (GB)

(73) Assignee: ACAL ENERGY LIMITED, Runcorn, Cheshire (GB)

( * ) Notice: Subject to any disclaimer, the term of this patent is extended or adjusted under 35 U.S.C. 154(b) by 354 days.

(21) Appl. No.: 13/996,490

(22) PCT Filed: Dec. 16, 2011

(86) PCT No.: PCT/GB2011/052500
§ 371 (c)(1),
(2), (4) Date: Sep. 17, 2013

(87) PCT Pub. No.: WO2012/085542
PCT Pub. Date: Jun. 28, 2012

(65) Prior Publication Data
US 2014/0004391 A1    Jan. 2, 2014

(30) Foreign Application Priority Data
Dec. 23, 2010 (GB) .................................. 1021904.6

(51) Int. Cl.
*H01M 8/20* (2006.01)
*H01M 4/90* (2006.01)
*H01M 8/18* (2006.01)
*H01M 8/10* (2016.01)

(52) U.S. Cl.
CPC .............. *H01M 8/20* (2013.01); *H01M 4/9016* (2013.01); *H01M 8/188* (2013.01); *H01M 2008/1095* (2013.01); *Y02E 60/528* (2013.01)

(58) Field of Classification Search
CPC ........................................................ H01M 8/20
See application file for complete search history.

(56) References Cited

U.S. PATENT DOCUMENTS

| | | | | |
|---|---|---|---|---|
| 4,396,687 A * | 8/1983 | Kummer | ................. | H01M 8/20 429/417 |
| 8,603,684 B2 * | 12/2013 | Creeth | ................. | H01M 8/103 429/400 |
| 8,753,783 B2 * | 6/2014 | Creeth | .................... | H01M 8/10 429/417 |
| 9,005,828 B2 * | 4/2015 | Creeth | ................. | H01M 4/8605 429/417 |
| 9,029,042 B2 * | 5/2015 | Creeth | ................. | H01M 8/188 429/479 |
| 2009/0317668 A1 * | 12/2009 | Creeth | ................ | H01M 4/8605 429/417 |
| 2010/0297522 A1 | 11/2010 | Creeth | | |

* cited by examiner

*Primary Examiner* — Jacob Marks
(74) *Attorney, Agent, or Firm* — Knobbe Martens Olson & Bear LLP

(57) ABSTRACT

This invention provides a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a non-volatile catholyte solution flowing fluid communication with the cathode, the catholyte solution comprising a polyoxometallate redox couple being at least partially reduced at the cathode in operation of the cell, and at least partially re-generated by reaction with the oxidant after such reduction at the cathode, the catholyte solution comprising at least about 0.075M of the said polyoxometallate, and a vanadium (IV) compound.

25 Claims, 5 Drawing Sheets

REGENERATIVE FUEL CELL WITH CATHOLYTE COMPRISING A POLYOXOMETALATE AND A VANADIUM (IV)-COMPOUND

CROSS-REFERENCE TO RELATED APPLICATIONS

This application is the U.S. National Phase under 35 U.S.C. §371 of International Application PCT/GB2011/052500, filed Dec. 16, 2011, which claims priority to U.K. Application No. 1021904.6, filed Dec. 23, 2010. The disclosures of the above-described applications are hereby incorporated by reference in their entirety.

The present invention relates to fuel cells, in particular to indirect or redox fuel cells which have applications in micro-fuel cells for electronic and portable electronic components, and also in larger fuel cells for the automotive industry and for stationary applications. The invention also relates to certain catholyte solutions for use in such fuel cells.

Fuel cells have been known for portable applications such as automotive and portable electronics technology for very many years, although it is only in to recent years that fuel cells have become of serious practical consideration. In its simplest form, a fuel cell is an electrochemical energy conversion device that converts fuel and oxidant into reaction product(s), producing electricity and heat in the process. In one example of such a cell, hydrogen is used as fuel, and air or oxygen as oxidant and the product of the reaction is water. The gases are fed respectively into catalysing, diffusion-type electrodes separated by a solid or liquid electrolyte which carries electrically charged particles between the two electrodes. In an indirect or redox fuel cell, the oxidant (and/or fuel in some cases) is not reacted directly at the electrode but instead reacts with the reduced form (oxidised form for fuel) of a redox couple to oxidise it, and this oxidised species is fed to the cathode.

There are several types of fuel cell characterised by their different electrolytes. The liquid electrolyte alkali electrolyte fuel cells have inherent disadvantages in that the electrolyte dissolves $CO_2$ and needs to be replaced periodically. Polymer electrolyte or PEM-type cells with proton-conducting solid cell membranes are acidic and avoid this problem. However, it has proved difficult in practice to attain power outputs from such systems approaching the theoretical maximum level, due to the relatively poor electrocatalysis of the oxygen reduction reaction. In addition expensive noble metal electrocatalysts are often used.

U.S. Pat. No. 3,152,013 discloses a gaseous fuel cell comprising a cation-selective permeable membrane, a gas permeable catalytic electrode and a second electrode, with the membrane being positioned between the electrodes and in to electrical contact only with the gas permeable electrode. An aqueous catholyte is provided in contact with the second electrode and the membrane, the catholyte including an oxidant couple therein. Means are provided for supplying a fuel gas to the permeable electrode, and for supplying a gaseous oxidant to the catholyte for oxidising reduced oxidant material. The preferred catholyte and redox couple is HBr/KBr/$Br_2$. Nitrogen oxide is disclosed as a preferred catalyst for oxygen reduction, but with the consequence that pure oxygen was required as oxidant, the use of air as oxidant requiring the venting of noxious nitrogen oxide species.

An acknowledged problem concerning electrochemical fuel cells is that the theoretical potential of a given electrode reaction under defined conditions can be calculated but never completely attained. Imperfections in the system inevitably result in a loss of potential to some level below the theoretical potential attainable from any given reaction. Previous attempts to reduce such imperfections include the selection of catholyte additives which undergo oxidation-reduction reactions in the catholyte solution. For example, U.S. Pat. No. 3,294,588 discloses the use of quinones and dyes in this capacity. Another redox couple which has been tried is the vanadate/vanadyl couple, as disclosed in U.S. Pat. No. 3,279,949.

According to U.S. Pat. No. 3,540,933, certain advantages could be realised in electrochemical fuel cells by using the same electrolyte solution as both catholyte and anolyte. This document discloses the use of a liquid electrolyte containing more than two redox couples therein, with equilibrium potentials not more than 0.8V apart from any other redox couple in the electrolyte.

The matching of the redox potentials of different redox couples in the electrolyte solution is also considered in U.S. Pat. No. 3,360,401, which concerns the use of an intermediate electron transfer species to increase the rate of flow of electrical energy from a fuel cell.

Several types of proton exchange membrane fuel cells exist. For example, in U.S. Pat. No. 4,396,687 a fuel cell is disclosed which comprises regenerable anolyte and catholyte solutions. The anolyte solution is one which is reduced from an oxidised state to a reduced state by exposure of the anolyte solution to hydrogen. According to U.S. Pat. No. 4,396,687, preferred anolyte solutions are tungstosilicic acid ($H_4SiW_{12}O_{40}$) or tungstophosphoric acid ($H_3PW_{12}O_{40}$) in the presence of a catalyst.

The preferred catholyte solution of U.S. Pat. No. 4,396,687 is one which is re-oxidised from a reduced state to an oxidised state by direct exposure of the catholyte solution to oxygen. The catholyte of U.S. Pat. No. 4,396,687 includes a mediator component comprising a solution of $VOSO_4$. The mediator functions as an electron sink which is reduced from an oxidation state of $V^{(V)}$ to $V^{(IV)}$. The catholyte also includes a catalyst for regenerating the mediator to its oxidised state, $(VO_2)_2SO_4$. The catalyst present in the catholyte of U.S. Pat. No. 4,396,687 is a polyoxometallate (POM) solution, namely $H_5PMo_{10}V_2O_{40}$. This disclosure, and U.S. Pat. No. 4,407,902 of the same company specifically mention the addition of $VOSO_4$ to a catholyte containing $H_5PMo_{10}V_2O_{40}$ with concentrations of 0.8M $VOSO_4$ and 0.059M $H_5PMo_{10}V_2O_{40}$.

Besides U.S. Pat. No. 4,396,687, a number of other attempts to use oxometallate catalysts have been made. For example, in U.S. Pat. No. 5,298,343, cathode systems comprising solid metal catalysts, oxometallates and metallic acids, such as molybdic acid are disclosed.

In addition, WO 96/31912 describes the use of embedded polyoxometallates in an electrical storage device. The redox nature of the polyoxometallate is employed in conjunction with carbon electrode material to temporarily store electrons.

US 2005/0112055 discloses the use of polyoxometallates for catalysing the electrochemical generation of oxygen from water. GB 1176633 discloses a solid molybdenum oxide anode catalyst.

US 2006/0024539 discloses a reactor and a corresponding method for producing electrical energy using a fuel cell by selectively oxidising CO at room temperature using polyoxometallate compounds and transition metal compounds over metal-containing catalysts.

EP-A-0228168 discloses activated carbon electrodes which are said to have improved charge storage capacity due to the adsorption of polyoxometallate compounds onto the activated carbon.

Prior art fuel cells all suffer from one or more of the following disadvantages:

They are inefficient; they are expensive and/or expensive to assemble; they use expensive and/or environmentally unfriendly materials; they yield inadequate and/or insufficiently maintainable current densities and/or cell potentials; they are too large in their construction; they operate at too high a temperature; they produce unwanted by-products and/or pollutants and/or noxious materials; they have not found practical, commercial utility in portable applications such as automotive and portable electronics.

It is an object of the present invention to overcome or ameliorate one or more of the aforesaid disadvantages. It is a further object of the present invention to provide an improved catholyte solution for use in redox fuel cells.

Accordingly, the present invention provides a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a non-volatile catholyte solution flowing fluid communication with the cathode, the catholyte solution comprising a polyoxometallate redox couple being at least partially reduced at the cathode in operation of the cell, and at least partially re-generated by reaction with the oxidant after such reduction at the cathode, the catholyte solution comprising at least about 0.075M of the said polyoxometallate, wherein the polyoxometallate is represented by the formula:

$$X_a[Z_bM_cO_d]$$

wherein:
X is selected from hydrogen, alkali metals, alkaline earth metals, ammonium or alkyl ammonium and combinations of two or more thereof;
Z is selected from B, P, S, As, Si, Ge, Ni, Rh, Sn, Al, Cu, I, Br, F, Fe, Co, Cr, Zn, $H_2$, Te, Mn and Se and combinations of two or more thereof;
M comprises at least one V atom, and M is a metal selected from Mo, W, V, Nb, Ta, Mn, Fe, Co, Cr, Ni, Zn Rh, Ru, Tl, Al, Ga, In and other metals selected from the $1^{st}$, $2^{nd}$ and $3^{rd}$ transition metal series and the lanthanide series and combinations of two or more thereof;
a is a number of X necessary to charge balance the $[Z_bM_cO_d]$ anion;
b is from 0 to 20;
c is from 1 to 40; and
d is from 1 to 180,
the catholyte further comprising a vanadium(IV) compound.

Many current fuel cell technologies employ gas-reactive cathodes, where oxygen is flowed to the electrode where it then reacts with a catalyst to produce water. In many cases the catalyst employed is platinum, a precious metal. Not only does this increase the costs of the overall fuel cell, but the inefficiency of the reaction leads to a loss in available power.

The fuel cell design of the present invention uses an aqueous cathode system with a catholyte consisting of two soluble active species, a mediator and a catalyst, or one soluble active species which is capable of performing as both the catalyst and mediator species. In the two species system, oxygen is reduced in solution by the catalyst, which in turn oxidises the mediator, which is then reduced back to its original state at the electrode. Completion of this cycle creates a regenerative redox cathode:

Polyoxometallates (POMs) are a family of materials which are disclosed in our PCT/GB2007/050151 as catalyst/mediator components of catholytes for use in such fuel cell systems. In particular vanadium containing polyoxometallates have appropriate redox properties and are now recognised to be preferred catholytes. However we have found that upon reduction of a vanadium containing polyoxometallate, the vanadium(IV) generated has a tendency to come out of the cage structure. The more vanadium present in the system the more likely this is to happen, but more vanadium can be desirable to promote the reoxidation reaction with oxygen. Losing vanadium from the POM cage structure means that 100% re-oxidation of the catholyte is not achievable and that maximum performance is therefore limited. It would be advantageous to prevent the vanadium(IV) from leaving the POM cage structure or introduce a way in which to encourage it to remain in place.

Le Chatelier's principle states that if a dynamic equilibrium is disturbed by changing the conditions, the position of equilibrium moves to counteract the change. If the change upon reduction of a vanadium containing POM is represented as:

$$(13-m)[H_{(2m-1)}PMo_{(12-m)}V^{(IV)}{}_m O_{40}]^{4-} + 28H^+ \rightleftharpoons (12-m)[H_{(2m-3)}PMo_{(13-m)}V^{(IV)}{}_{(m-1)}O_{40}]^{4-} + 12VO^{2+} + H_3PO_4 + 24H_2O$$

Then Le Chatelier's principle suggests that the deliberate addition of $VO^{2+}$ ions should shift the equilibrium back towards the complete POM cage structure on the left of the equation. Therefore it was hypothesised that the addition of a vanadium(IV) salt to a vanadium containing polyoxometalate solution would improve fuel cell performance, both via encouraging vanadium to retain in the cage structure upon reduction and by providing an additional mediating effect at the electrode.

Preferably, the catholyte is an aqueous based solution.

Preferred polyoxometalate compounds have a Keggin structure with general formula $X_a[Z_1M_{12}O_{40}]$.

Preferred metals for M are molybdenum, tungsten and vanadium and combinations of two or more of these, provided that the polyoxometallate must have at least one of M being vanadium. Preferably 2-5 of M are vanadium, more preferably 3 or 4, and most preferably 4.

The remaining M is preferably either molybdenum or tungsten or a combination of both.

Phosphorous is particularly preferred for Z.

X is preferably selected from hydrogen, alkali metals, alkaline earth metals, ammonium or alkyl ammonium and combinations of two or more thereof. Particularly preferred examples include hydrogen, sodium, lithium and combinations thereof.

Specific non-limiting examples of catholytes of the present invention are $H_{3+e}PMo_{12-e}V_eO_{40}$ and $H_{3+e}PW_{12-e}V_eO_{40}$,

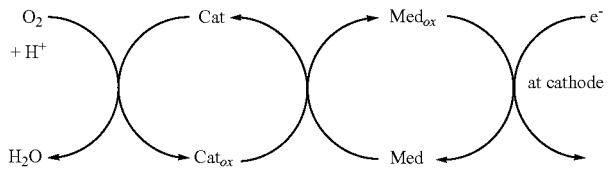

where e=2-5; $H_fX_gPMo_{12-3}V_eO_{40}$, $H_fX_gPW_{12-e}V_eO_{40}$ where e=2-5, f+g=3+e and X=Na, Li or combinations thereof.

The concentration of the polyoxometallate in the catholyte solution is preferably at least about 0.1M, more preferably at least about 0.15M and most preferably at least about 0.20M.

Also included as part of the catholyte is a vanadium(IV) compound. Any vanadium(IV) containing compound can be used but specific examples include $VO_2$, $V_2O_4$, $VOSO_4$, $VO(acac)_2$, $VO(ClO_4)_2$, $VO(BF_4)_2$, and hydrated versions of these materials. Particularly preferred examples are $VO_2$, $V_2O_4$ and $VOSO_4.xH_2O$.

Preferably the concentration of the vanadium (IV) compound is at least about 0.05M or at least about 0.1M or at least about 0.15M or at least about 0.2M or at least about 0.25M or at least about 0.3M.

is Preferably the molar ratio between the polyoxymetallate and the vanadium(IV) compound is at least about 1:10 or at least about 1.5:10 or at least about 2:10 or at least about 2.5:10 or at least about 3:10.

Particularly preferred catholyte combinations include $H_{3+e}PMo_{12-e}V_eO_{40}$ or $H_{3+e}PW_{12-e}V_eO_{40}$ where e=2-5 with added $V_2O_4$, and $H_fX_gPMo_{12-e}V_eO_{40}$ or $H_fX_gPW_{12-e}V_eO_{40}$ where e=2-5, f+g=3+e and X=Na, Li or combinations thereof with added $VOSO_4$.

Preferred ranges for b are from 0 to 15, more preferably 0 to 10, still more preferably 0 to 5, even more preferably 0 to 3, and most preferably 0 to 2.

Preferred ranges for c are from 5 to 20, more preferably from 10 to 18, most preferably 12.

Preferred ranges for d are from 30 to 70, more preferably 34 to 62, most preferably 34 to 40.

A combination of hydrogen and an alkali metal and/or alkaline earth metal is particularly preferred for X. One such preferred combination is hydrogen and sodium.

In a preferred embodiment of the present invention, the polyoxometallate comprises vanadium, more preferably vanadium and molybdenum. Preferably the polyoxometallate comprises from 2 to 4 vanadium centres. Thus, particularly preferred polyoxometallates include $H_3Na_2PMo_{10}V_2O_{40}$, $H_3Na_3PMo_9V_3O_{40}$, or $H_3Na_4PMo_8V_4O_{40}$, and compounds of intermediate composition. In addition, a mixture of these or other polyoxometallate catalysts is also envisaged. Preferably at least one X is hydrogen, and in some embodiments all X will be hydrogen. However, in some cases it may be preferred that not all X be hydrogen, for example in that case that at least two of X are not hydrogen. For example in that case, X may comprise at least one hydrogen and at least one other material selected from alkali metals, alkaline earth metals, ammonium and combinations of two or more thereof.

In one preferred embodiment of the invention, the ion selective PEM is a cation selective membrane which is selective in favour of protons versus other cations.

The cation selective polymer electrolyte membrane may be formed from any suitable material, but preferably comprises a polymeric substrate having to cation exchange capability. Suitable examples include fluororesin-type ion exchange resins and non-fluororesin-type ion exchange resins. Fluororesin-type ion exchange resins include perfluorocarboxylic acid resins, perfluorosulfonic acid resins, and the like. Perfluorocarboxylic acid resins are preferred, for example "Nafion" (Du Pont Inc.), "Flemion" (Asahi Gas Ltd), "Aciplex" (Asahi Kasei Inc), and the like. Non-fluororesin-type ion exchange resins include polyvinyl alcohols, polyalkylene oxides, styrene-divinylbenzene ion exchange resins, and the like, and metal salts thereof. Preferred non-fluororesin-type ion exchange resins include polyalkylene oxide-alkali metal salt complexes. These are obtainable by polymerizing an ethylene oxide oligomer in the presence of lithium chlorate or another alkali metal salt, for example. Other examples include phenolsulphonic acid, polystyrene sulphonic, polytrifluorostyrene sulphonic, sulphonated trifluorostyrene, sulphonated copolymers based on $\alpha,\beta,\beta$ trifluorostyrene monomer, radiation-grafted membranes. Non-fluorinated membranes include sulphonated poly(phenylquinoxalines), poly (2,6 diphenyl-4-phenylene oxide), poly(arylether sulphone), poly(2,6-diphenylenol), acid-doped polybenzimidazole, sulphonated polyimides, styrene/ethylene-butadiene/styrene triblock copolymers; partially sulphonated polyarylene ether sulphone, partially sulphonated polyether ether ketone (PEEK); and polybenzylsuphonic acid siloxane (PBSS).

In some cases it may be desirable for the ion selective polymer electrolyte membrane to comprise a bi-membrane. The bimembrane if present will generally comprise a first cation selective membrane and a second anion selective membrane. In this case the bimembrane may comprise an adjacent pairing of oppositely charge selective membranes. For example the bi-membrane may comprise at least two discreet membranes which may be placed side-by-side with an optional gap therebetween. Preferably the size of the gap, if any, is kept to a minimum in the redox cell of the invention. The use of a bi-membrane may be used in the redox fuel cell of the invention to maximise the potential of the cell, by maintaining the potential due to a pH drop between the anode and catholyte solution. Without being limited by theory, in order for this potential to be maintained in the membrane system, at some point in the system, protons must be the dominant charge transfer vehicle. A single cation-selective membrane may not achieve this to the same extent due to the free movement of other cations from the catholyte solution In the membrane.

In this case the cation selective membrane may be positioned on the cathode side of the bimembrane and the anion selective membrane may be positioned on the anode side of the bimembrane. In this case, the cation selective membrane is adapted to allow protons to pass through the membrane from the anode side to the cathode side thereof in operation of the cell. The anion selective membrane is adapted substantially to prevent cationic materials from passing therethrough from the cathode side to the anode side thereof, although in this case anionic materials may pass from the cathode side of the anionic-selective membrane to the anode side thereof, whereupon they may combine with protons passing through the membrane in the opposite direction. Preferably the anion selective membrane is selective for hydroxyl ions, and combination with protons therefore yields water as product.

In a second embodiment of the invention the cation selective membrane is positioned on the anode side of the bimembrane and the anion selective membrane is positioned on the cathode side of the bi-membrane. In this case, the cation selective membrane is adapted to allow protons to pass through the membrane from the anode side to the cathode side thereof in operation of the cell. In this case, anions can pass from the cathode side into the interstitial space of the bimembrane, and protons will pass from the anode side. It may be desirable in this case to provide means for flushing such protons and anionic materials from the interstitial space of the bimembrane. Such means may comprises one or more perforations in the cation selective membrane, allowing such flushing directly through the membrane. Alternatively means may be provided for channelling flushed materials around the cation selective membrane from the interstitial space to the cathode side of the said membrane.

According to another aspect of the present invention, there is provided a method of operating a proton exchange membrane fuel cell comprising the steps of:
a) forming H$^+$ ions at an anode situated adjacent to a proton exchange membrane;
b) supplying the catholyte of the invention with its redox couple in an oxidised state to a cathode situated oppositely adjacent to the proton exchange membrane; and
c) allowing the catalyst to become reduced upon contact with the cathode concomitantly with H$^+$ ions passing through the membrane to balance charge.

In a preferred embodiment, the catholyte is supplied from a catholyte reservoir.

The method of the above fourth aspect may additionally comprise the step of:
d) passing the catholyte from the cathode to a reoxidation zone wherein the catalyst is reoxidised.

In an especially preferred embodiment, the method of the above aspect comprises the step of:
e) passing the catholyte from the reoxidation zone to the catholyte reservoir.

In this embodiment, the cell is cyclic and the catalyst in the cathode can be repeatedly oxidised and reduced without having to be replaced.

The fuel cell of the invention may comprise a reformer configured to convert available fuel precursor such as LPG, LNG, gasoline or low molecular weight alcohols into a fuel gas (eg hydrogen) through a steam reforming reaction. The cell may then comprise a fuel gas supply device configured to supply the reformed fuel gas to the anode chamber It may be desirable in certain applications of the cell to provide a fuel humidifier configured to humidify the fuel, eg hydrogen. The cell may then comprise a fuel supply device configured to supply the humidified fuel to the anode chamber.

An electricity loading device configured to load an electric power may also be provided in association with the fuel cell of the invention.

Preferred fuels include hydrogen; metal hydrides (for example borohydride which may act as a fuel itself or as a provider of hydrogen), ammonia, low molecular weight alcohols, aldehydes and carboxylic acids, sugars and biofuels, as well as LPG, LNG or gasoline.

Preferred oxidants include air, oxygen and peroxides

The anode in the redox fuel cell of the invention may for example be a hydrogen gas anode or a direct methanol anode; other low molecular weight alcohols such as ethanol, propanol, dipropylene glycol; ethylene glycol; also aldehydes formed from these and acid species such as formic acid, ethanoic acid etc. In addition the anode may be formed from a bio-fuel cell type system where a bacterial species consumes a fuel and either produces a mediator which is oxidised at the electrode, or the bacteria themselves are adsorbed at the electrode and directly donate electrons to the anode.

The cathode in the redox fuel cell of the invention may comprise as cathodic material carbon, gold, platinum, nickel, metal oxide species. However, it is preferable that expensive cathodic materials are avoided, and therefore preferred cathodic materials include carbon, nickel and metal oxide. One preferable material for the cathodes is reticulated vitreous carbon or carbon fibre based electrodes such as carbon felt. Another is nickel foam. The cathodic material may be constructed from a fine dispersion of particulate cathodic material, the particulate dispersion being held together by a suitable adhesive, or by a proton conducting polymeric material. The cathode is designed to create maximum flow of catholyte solution to the cathode surface. Thus it may consist of shaped flow regulators or a three dimensional electrode; the liquid flow may be managed in a flow-by arrangement where there is a liquid channel adjacent to the electrode, or in the case of the three dimensional electrode, where the liquid is forced to flow through the electrode. It is intended that the surface of the electrode is also the electrocatalyst, but it may be beneficial to adhere the electrocatalyst in the form of deposited particles on the surface of the electrode.

The redox couple flowing in solution in the cathode chamber in operation of the cell is used in the invention as a catalyst for the reduction of oxygen in the cathode chamber, in accordance with the following (wherein Sp is the redox couple species).

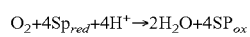
$$O_2 + 4Sp_{red} + 4H^+ \rightarrow 2H_2O + 4SP_{ox}$$

The polyoxometallate redox couple, and any other ancillary redox couple, utilised in the fuel cell of the invention should be non-volatile, and is preferably soluble in aqueous solvent. Preferred redox couples should react with the oxidant at a rate effective to generate a useful current in the electrical circuit of the fuel cell, and react with the oxidant such that water is the ultimate end product of the reaction.

The fuel cell of the invention requires the presence of at least about 0.075M of a polyoxometallate species in the catholyte solution. However, in some circumstances it may also be possible to include other redox couples in the catholyte solution in addition to the polyoxometallate species and the vanadium (IV) compound. There are many suitable examples of such ancillary redox couples, including ligated transition metal complexes and other polyoxometallate species. Specific examples of suitable transition metal ions which can form such complexes include manganese in oxidation states II-V, Iron I-IV, copper I-III, cobalt I-III, nickel I-III, chromium II-VII, titanium II-IV, tungsten IV-VI, vanadium II-V and molybdenum II-VI. Ligands can contain carbon, hydrogen, oxygen, nitrogen, sulphur, halides, phosphorus. Ligands may be chelating complexes include Fe/EDTA and Mn/EDTA, NTA, 2-hydroxyethylenediaminetriacetic acid, or non-chelating such as cyanide.

In some cases, it may be preferable however to avoid the presence in the catholyte solution of the invention of any mediator, and to rely on the redox behaviour of the polyoxometallate material(s) alone.

The fuel cell of the invention may operate straightforwardly with a redox couple catalysing in operation of the fuel cell the reduction of oxidant in the cathode chamber. However, in some cases, and with some redox couples, it may be necessary and/or desirable to incorporate a catalytic mediator in the cathode chamber.

Various aspects of the present invention will now be more particularly described with reference to the following figures which illustrate embodiments of the present invention:

Figure 1:
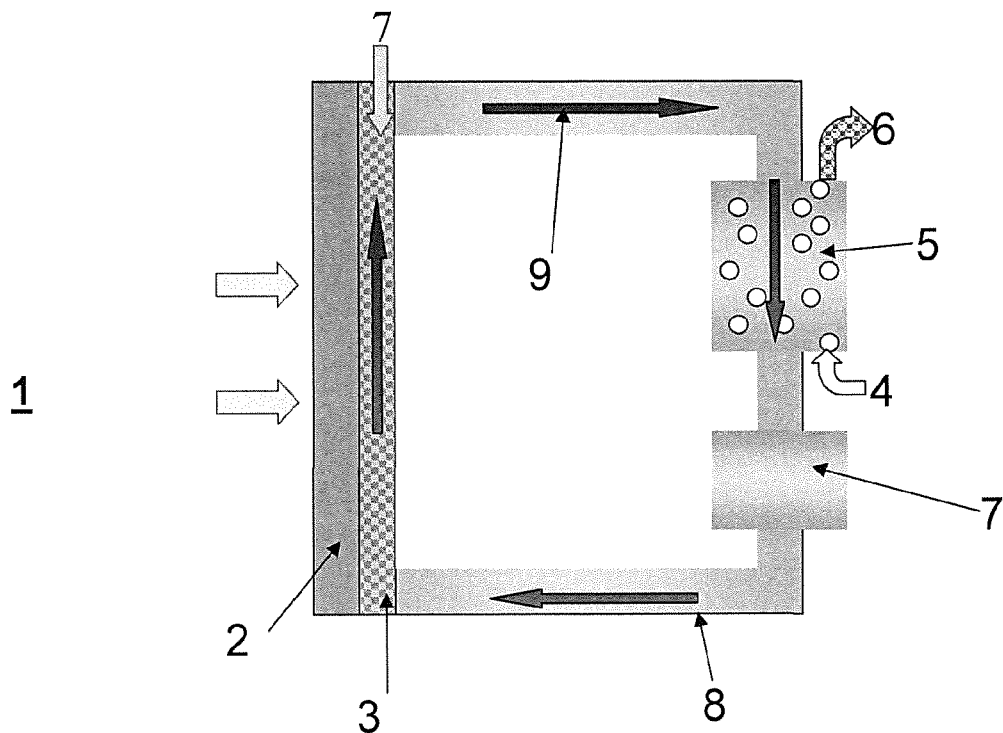
FIG. 1 illustrates a schematic view of the cathode compartment of a fuel cell in accordance with the present invention.

Referring to FIG. 1, there is shown the cathode side of fuel cell 1 in accordance with the invention comprising a polymer electrolyte membrane 2 separating an anode (not shown) from cathode 3. Cathode 3 comprises in this diagram reticulated carbon and is therefore porous. However, other cathodic materials such as platinum may be used. Polymer electrolyte membrane 2 comprises a cation selective membrane through which protons generated by the (optionally catalytic) oxidation of fuel (in this case hydrogen) in the anode chamber pass in operation of the cell. Electrons generated at the anode by the oxidation of fuel gas flow in an electrical circuit (not shown) and are returned to cathode 3. Fuel gas (in this case hydrogen) is supplied to the fuel gas passage of the anode chamber (not shown), while the oxidant (in this case air) is supplied to oxidant inlet 4 of cathode gas reaction chamber 5. Cathode gas reaction chamber 5 (the catalyst reoxidation zone) is provided with exhaust 6, through which the by-products of the fuel cell reaction (eg water and heat) can be discharged.

A catholyte solution comprising the oxidised form of the polyoxometallate redox catalyst is supplied in operation of the cell from catholyte reservoir 7 into the cathode inlet channel 8. The catholyte passes into reticulated carbon cathode 3, which is situated adjacent membrane 2. As the catholyte passes through cathode 3, the polyoxometallate catalyst is reduced and is then returned to cathode gas reaction chamber 5 via cathode outlet channel 9.

Due to the advantageous composition of the catholyte of the present invention, reoxidation of the catalyst occurs very rapidly, which allows the fuel cell to produce a higher sustainable current than with catholytes of the prior art.

A comparative test highlighting the improved performance of the catholyte of the present invention over prior art catholytes was performed as described in the following example.

EXAMPLE 1

Synthesis of Example Catholytes

Catholytes of the general formulae $H_fX_gPMo_{12-e}V_eO_{40}$ where e=2-5, f+g=3+e and X=Na, Li etc. can be synthesised according to method described by J H Grate et al (WO9113681).

Catholytes of the general formulae $H_{3+e}PMo_{12-e}V_eO_{40}$ can be synthesised using a method adapted from that reported by V F Odyakov et al in *Appl Cat A: General*, 2008, 342, 126.

The incorporation of vanadium(IV) compounds is achieved via the addition of appropriate quantities of the vanadium(IV) material to reach the desired concentration, usually in solid form, to the aqueous polyoxometallate solution with stirring, and heating where necessary, to ensure complete dissolution.

EXAMPLE 2

Addition of $V_2O_4$ to $H_6PMo_9V_3O_{40}$

Figure 2:
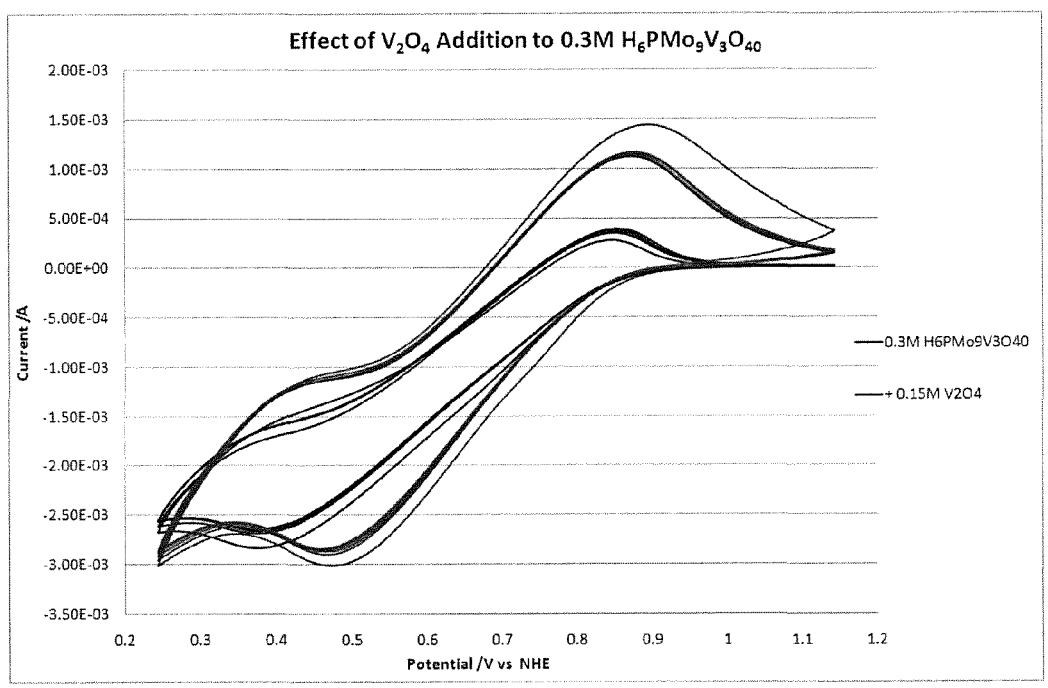
FIG. 2 shows data demonstrating the effect of increasing V(IV) concentration in a V$_4$ POM catholyte system according to the invention.

An experiment was conducted to examine the effect of the addition of $V_2O_4$ to $H_6PMo_9V_3O_{40}$ (aq) on the electrochemical properties of the catholyte. A standard three electrode cell was used with a glassy carbon electrode, a reference calomel electrode (SCE) and a platinum counter electrode. Cyclic voltammograms (FIG. 2) were recorded at 0.05 V/s at room temperature for 0.3M $H_6PMo_9V_3O_{40}$ (aq) and for 0.3M $H_6PMo_9V_3O_{40}$ (aq) with 0.15M $V_2O_4$ added. The cyclic voltammograms recorded show that when $V_2O_4$ is added to achieve a 0.15M concentration in 0.3M $H_6PMo_9V_3O_{40}$ (aq), an improvement in electrode performance is observed noted by the earlier on set and increased magnitude of reduction current with respect to the standard 0.3M $H_6PMo_9V_3O_{40}$ (aq) system.

A subsequent fuel cell test was performed to determine the effect of $V_2O_4$ addition on the fuel cell performance of the $H_6PMo_9V_3O_{40}$ (aq) catholyte. To do this a redox regenerative cathode and hydrogen anode were used.

A test cell was constructed with 25 cm² active area, Nafion 212 membrane electrode assembly (Ion Power) and Reticulated Vitreous Carbon cathode. Polarisation curves were collected at 80° C., a catholyte flow rate of 150 ml/min and $H_2$ pressure of 0.5 bar with a sweep rate of 500 mA/s.

Figure 3:
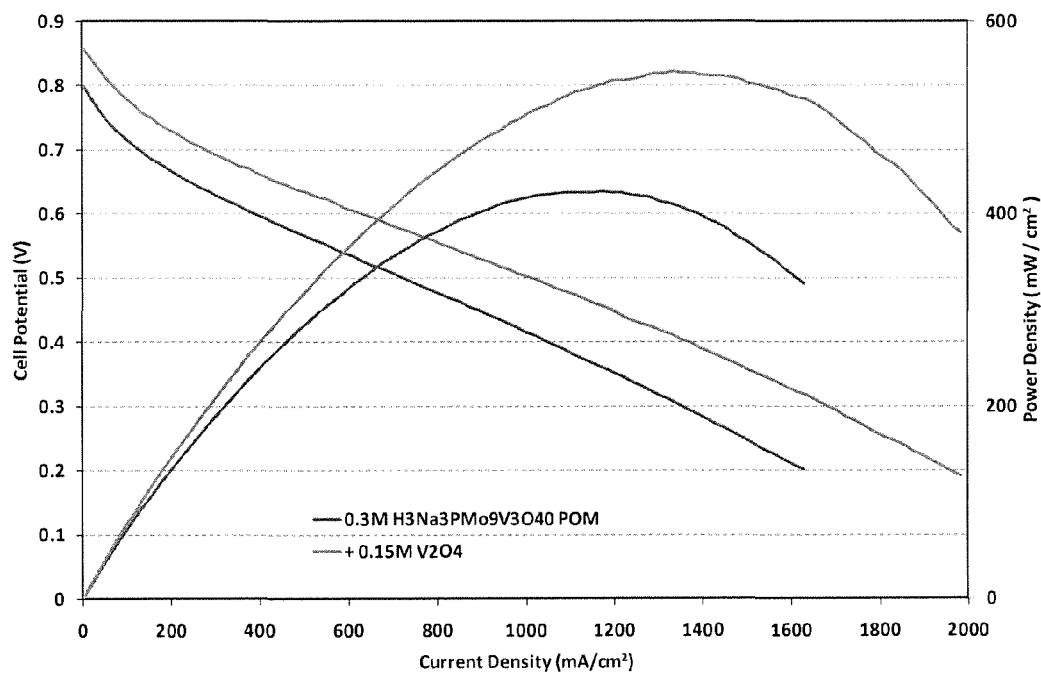
FIG. 3 shows further comparative data demonstrating polarisation and power profiles achievable with fuel cells in accordance with the invention.

The resulting polarisation and power curves (FIG. 3) clearly show that the catholyte with added $V_2O_4$ outperforms the catholyte without any $V_2O_4$ added.

Figure 4:
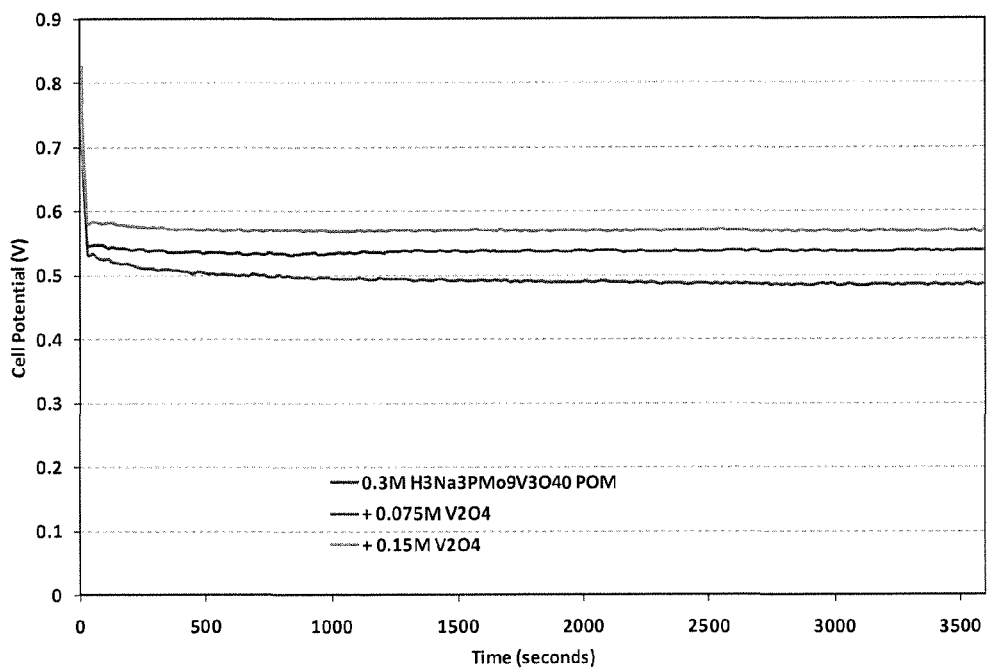
FIG. 4 shows data demonstrating the effect on cell potential of increasing V(IV) concentration in a first catholyte system according to the invention.

Furthermore, steady state experiments show that the catholyte with added $V_2O_4$ is capable of maintaining a higher potential when a constant current of 400 mA/cm² is drawn from the system (FIG. 4):

EXAMPLE 3

Addition of $VOSO_4$ to $H_3Na_4PMo_8V_4O_{40}$ (aq)

Figure 5:
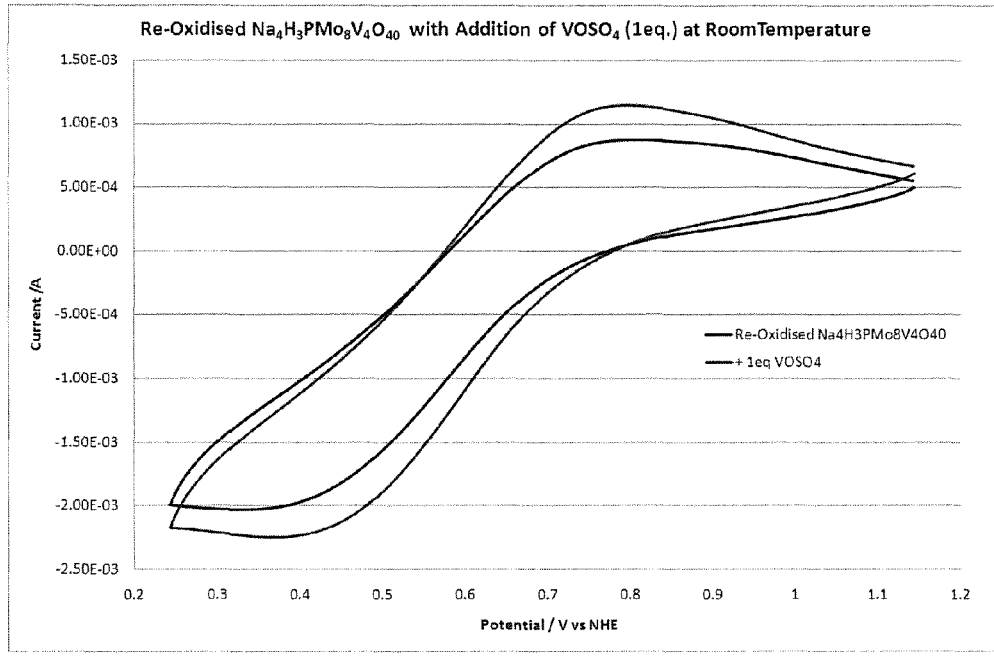
FIG. 5 shows data demonstrating the effect of increasing V(IV) concentration in a second catholyte system according to the invention.
Figure 6:
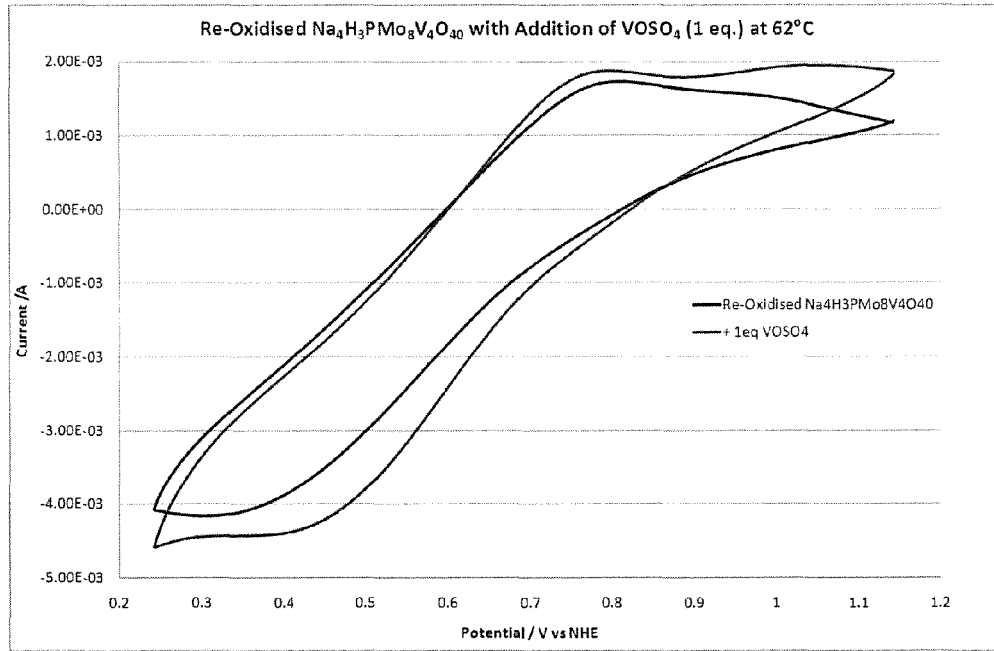
FIG. 6 shows data demonstrating the effect of increasing V(IV) concentration in the second catholyte system according to the invention.

An experiment was conducted to examine the effect of the addition of $VOSO_4$ to $H_3Na_4PMo_8V_4O_{40}$ (aq) on the electrochemical properties of the catholyte. A standard three electrode cell was used with a glassy carbon electrode, a reference calomel electrode (SCE) and a platinum counter electrode. Cyclic voltammograms (FIGS. 5 and 6) were recorded at 0.05 V/s at room temperature and at 62° C. for 0.3M $H_3Na_4PMo_8V_4O_{40}$ (aq) and for 0.3M $H_3Na_4PMo_8V_4O_{40}$ (aq) with 0.3M $VOSO_4$ added. The sample of to $H_3Na_4PMo_8V_4O_{40}$ (aq) used in both cases had been reduced electrochemically and re-oxidised via contact with air prior to analysis. The cyclic voltammograms recorded show that when $VOSO_4$ is added to achieve a 0.3M concentration in 0.3M $H_3Na_4PMo_8V_4O_{40}$ (aq), an improvement in electrode performance is observed noted by the earlier onset and increased magnitude of reduction current with respect to the standard 0.3M $H_3Na_4PMo_8V_4O_{40}$ (aq) system.

A subsequent fuel cell test was performed to determine the effect of $VOSO_4$ addition on the fuel cell performance of the $H_3Na_4PMo_8V_4O_{40}$ (aq) catholyte. To do this a redox regenerative cathode and hydrogen anode were used.

A test cell was constructed with 25 cm² active area, GORE Primea membrane electrode assembly (Ion Power) and Reticulated Vitreous Carbon cathode. Polarisation curves were collected at 80° C., a catholyte flow rate of 150 ml/min and $H_2$ pressure of 0.5 bar with a sweep rate of 500 mA/s.

Figure 7:
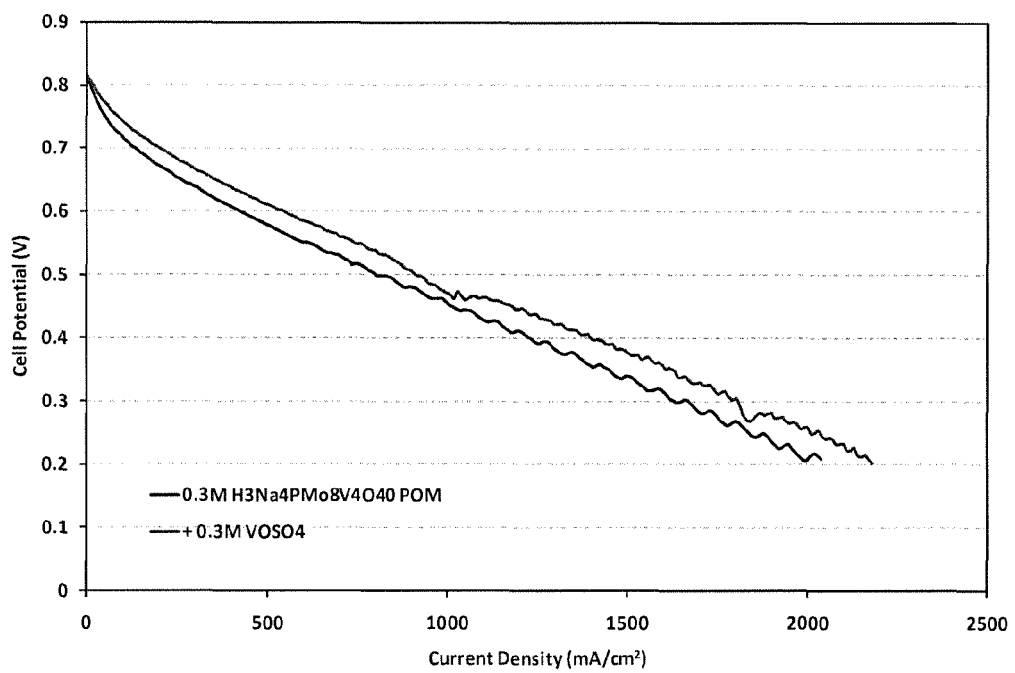
FIG. 7 shows further performance data on increasing V(IV) concentration.

The resulting polarisation curves (FIG. 7) show that the catholyte with added $VOSO_4$ outperforms the catholyte without any $VOSO_4$ added.

EXAMPLE 4 (Comparative)

Comparison of Prior Art Catholytes

Experiments have been conducted to draw comparisons with prior art catholyte formulations. Three aqueous catholytes were prepared, the first containing 0.059M $H_5PMo_{10}V_2O_{40}$ and 0.8M $VOSO_4$ (U.S. Pat. No. 4,396,687 & U.S. Pat. No. 4,407,902), the second containing 0.059M $H_7PMo_8V_4O_{40}$ and 0.8M $VOSO_4$, the third containing only 0.3M $H_3Na_4PMo_8V_4O_{40}$.

Figure 8:
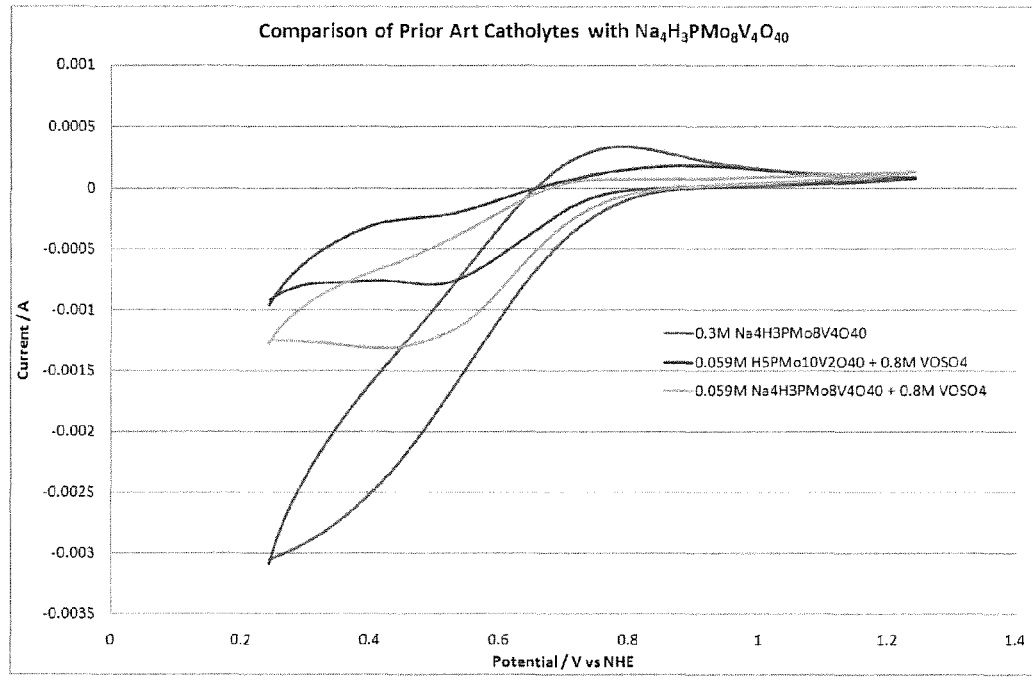
FIG. 8 shows electrochemical performance differences between certain prior art systems.

An electrochemical experiment was carried out using a standard three electrode cell with a glassy carbon electrode, a reference calomel electrode (SCE) and a platinum counter electrode. Cyclic voltammograms (FIG. 8) were recorded at 0.05 V/s at 60° C. for each of the three catholytes described above after bubbling each with oxygen for 1 hour. The cyclic voltammograms recorded show that the 0.3M $H_3Na_4PMo_8V_4O_{40}$ catholyte demonstrates improved electrode performance with respect to the other catholytes. From the examples presented above which show that catholytes of the present invention are improved with respect to 0.3M $H_3Na_4PMo_8V_4O_{40}$, it therefore follows that they also outperform these prior art catholyte examples.

A subsequent fuel cell test was performed to draw comparisons between catholytes of the present invention and those of the prior art. To do this a redox regenerative cathode and hydrogen anode were used.

A test cell was constructed with 25 cm² active area, Nafion 212 membrane electrode assembly (Ion Power) and Reticulated Vitreous Carbon cathode. Polarisation curves were collected at 80° C., a catholyte flow rate of 150 ml/min and $H_2$ pressure of 0.5 bar with a sweep rate of 500 mA/s.

Figure 9:
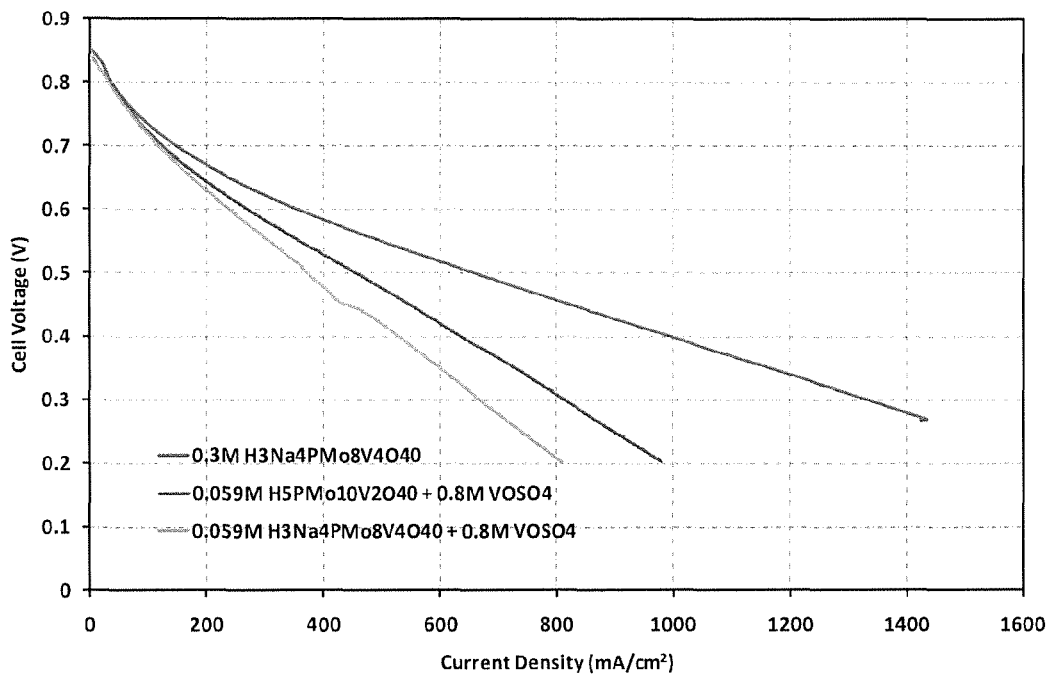
FIG. 9 shows further performance data for the catholyte solutions of FIG. 8.
Figure 10:
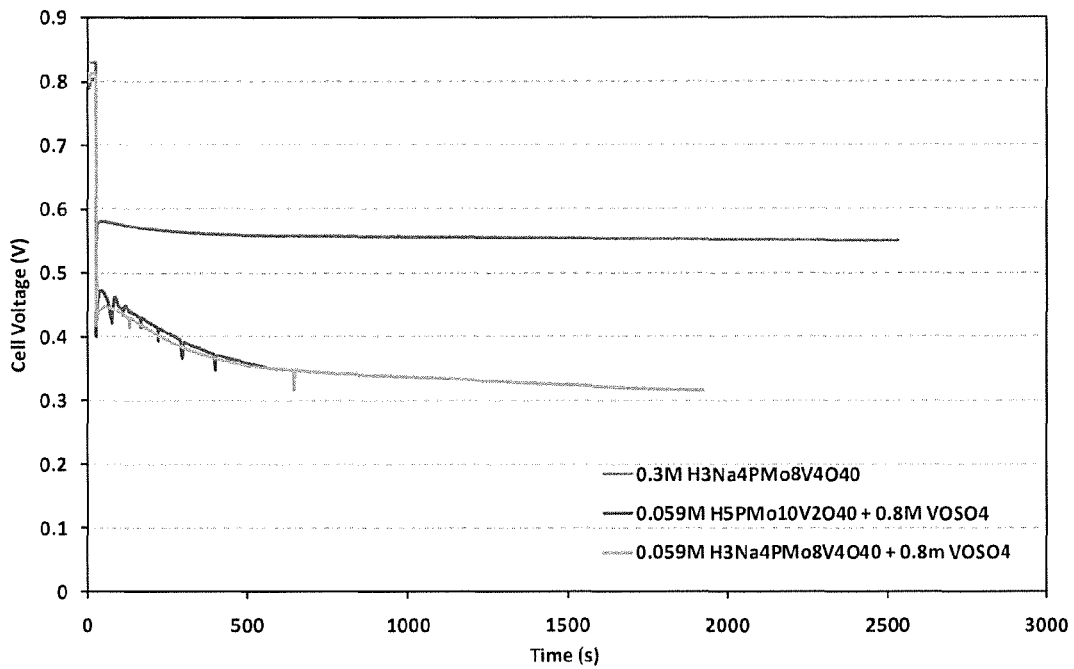
FIG. 10 shows further performance data for the catholyte solutions of FIG. 8.

The resulting polarisation curves and steady state performance data (FIGS. 9 and 10) show that the 0.3M $H_3Na_4PMo_8V_4O_{40}$ catholyte demonstrates improved electrode performance with respect to the other catholytes tested. From the examples presented above which show that catholytes of the present invention are improved with respect to 0.3M $H_3Na_4PMo_8V_4O_{40}$, it therefore follows that they also outperform these prior art catholyte examples.

What is claimed is:

1. A redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a non-volatile catholyte solution flowing fluid communication with the cathode, the catholyte solution comprising a polyoxometallate redox couple being at least partially reduced at the cathode in operation of the cell, and at least partially regenerated by reaction with the oxidant after such reduction at the cathode, the catholyte solution comprising at least about 0.075M of the said polyoxometallate, wherein the polyoxometallate is represented by the formula:

$$X_a[Z_bM_cO_d]$$

wherein:
X is selected from hydrogen, alkali metals, alkaline earth metals, ammonium or alkyl ammonium and combinations of two or more thereof; Z is selected from B, P, S, As, Si, Ge, Ni, Rh, Sn, M, Cu, I, Br, F, Fe, Co, Cr, Zn, $H_2$, Te, Mn and Se and combinations of two or more thereof;
M comprises at least one V atom, and M is a metal selected from Mo, W, V, Nb, Ta, Mn, Fe, Co, Cr, Ni, Zn Rh, Ru, Tl, M, Ga, In and other metals selected from the 1st, $2^{nd}$ and $3^{rd}$ transition metal series and the lanthanide series and combinations of two or more thereof;
a is a number of X necessary to charge balance the $[Z_bM_cO_d]$ anion;
b is from 0 to 20;
c is from 1 to 40; and
d is from 1 to 180, the catholyte further comprising a vanadium(IV) compound;
wherein the molar ratio between the vanadium (IV) compound and the polyoxometallate is between 0.25:1 and 1:1.

2. A redox fuel cell according to claim 1, wherein the polyoxometallate has the formula $Xa[Z_1M_{12}O_{40}]$.

3. A redox fuel cell according to claim 1, wherein b is from 0 to 2.

4. A redox fuel cell according to claim 1, wherein c is from 5 to 20.

5. A redox fuel cell according to claim 1 wherein d is from 30 to 70.

6. A redox fuel cell according to claim 1, wherein the polyoxymetallate comprises $H_{3+e}PMo_{12-e}V_eO_{40}$, $H_{3+e}PW_{12-e}V_eO_{40}$, $H_fX_gPMo_{12-e}V_eO_{40}$, $H_fX_gPW_{12-e}V_eO_{40}$ and combinations of two or more thereof;
where e is 2 to 5;
where f+g is 3+e; and
where X is Na or Li or combinations thereof.

7. A redox fuel cell according to claim 1, wherein the vanadium(IV) compound comprises at least one selected from $VO_2$, $V_2O_4$, $VOSO_4$, $VO(acac)_2$, $VO(ClO_4)_2$, $VO(SF_4)_2$, hydrated versions thereof, and combinations of two or more thereof.

8. A redox fuel cell according to claim 1, comprising a combination of $H_{3+e}PMo_{12-e}V_eO_{40}$ or $H_{3+e}PW_{12-e}V_eO_{40}$, where e is 2 to 5, with added $V_2O_4$ and/or $VOSO_4$.

9. A redox fuel cell according to claim 1, comprising a combination of $H_fX_gPMo_{12-e}V_eO_{40}$ or $H_fX_gPW_{12-e}V_eO_{40}$, where e is 2 to 5; where f+g is 3+e, and where X is Na or Li or combinations thereof, with added $V_2O_4$ and/or $VOSO_4$.

10. A redox fuel cell according to claim 1 wherein M is selected from vanadium, molybdenum, and combinations thereof.

11. A redox fuel cell according to claim 1 wherein M comprises $V_2$, $V_3$, $V_4$ or $V_5$.

12. A redox fuel cell according to claim 1 wherein Z is phosphorus.

13. A redox fuel cell according to claim 1 wherein X comprises a combination of hydrogen and alkali metal and/or alkaline earth metal ions, preferably lithium and combinations thereof.

14. A redox fuel cell according to claim 1 containing from 2 to 4 vanadium centres in the polyoxometailate.

15. A redox fuel cell according to claim 1 wherein the polyoxometallate comprises $H_3Na_2PMo_{10}V_2O_{40}$.

16. A redox fuel cell according to claim 1, wherein the polyoxometallate comprises $H_3Na_2PMo_9V_3O_{40}$.

17. A redox fuel cell according to claim 1 wherein the polyoxometallate comprises $H_3Na_4PMo_8V_4O_{40}$.

18. A redox fuel cell according to claim 1 wherein at least one X is hydrogen.

19. A redox fuel cell according to claim 18 wherein X comprises at least one hydrogen and at least one other material selected from alkali metals, alkaline earth metals, ammonium and combinations of two or more thereof.

20. A redox fuel cell according to claim 1 wherein the catholyte solution comprises at least one ancillary redox species.

21. A redox fuel cell according to claim 20 wherein the ancillary redox species is selected from ligated transition metal complexes, further polyoxometallate species, and combinations thereof.

22. A redox fuel cell according to claim 21 wherein the transition metal(s) in the transition metal complexes are selected from manganese in oxidation states II-V, Iron I-IV, copper I-III, cobalt I-III, nickel I-III, chromium (II-VII), titanium II-IV, tungsten IV-VI, vanadium II-V and molybdenum II-VI.

23. A fuel cell according to claim 1 wherein the catholyte solution is substantially free from any ancillary redox species.

24. A redox fuel cell according to claim 1 wherein the concentration of the polyoxometallate in the catholyte solution is at least 0.1M, preferably at least 0.15M, more preferably at least 0.20M.

25. A catholyte solution for use in a redox fuel cell according to claim 1, the solution comprising at least about 0.075M of the polyoxometaliate in combination with the vanadium (IV) compound.

\* \* \* \* \*